US006766662B2

United States Patent
Morishita et al.

(10) Patent No.: US 6,766,662 B2
(45) Date of Patent: Jul. 27, 2004

(54) METHOD OF MANUFACTURING GLASS PARTS FOR CONNECTING OPTICAL FIBERS, AND GLASS PARTS FOR CONNECTING OPTICAL FIBERS MANUFACTURED USING THE METHODS

(75) Inventors: Masahiro Morishita, Osaka (JP); Katsuya Kamisaku, Osaka (JP); Toshiaki Mizuno, Osaka (JP)

(73) Assignee: Nippon Sheet Glass Co., Ltd., Osaka (JP)

( * ) Notice: Subject to any disclaimer, the term of this patent is extended or adjusted under 35 U.S.C. 154(b) by 93 days.

(21) Appl. No.: 09/824,281

(22) Filed: Apr. 2, 2001

(65) Prior Publication Data

US 2001/0036339 A1 Nov. 1, 2001

(30) Foreign Application Priority Data

Apr. 5, 2000 (JP) ...................................... 2000-103420

(51) Int. Cl.[7] .............................................. C03B 23/04
(52) U.S. Cl. ............................. 65/110; 65/105; 65/108; 65/276; 65/278; 65/407; 65/501; 65/DIG. 9; 385/70; 385/98
(58) Field of Search ........................... 65/108–110, 406, 65/407, 38, 36, 47, 296, DIG. 9, 276–285, 45–46, 297, 382, 105, 439, 501; 385/50, 55, 70, 72

(56) References Cited

U.S. PATENT DOCUMENTS

| 2,711,055 A | * | 6/1955 | Majkrzak et al. | ............. 65/110 |
| 4,372,773 A | * | 2/1983 | Halasz | ........................ 65/110 |
| 4,822,389 A | * | 4/1989 | Berkey | ........................ 65/110 |
| 5,152,816 A | * | 10/1992 | Berkey | ........................ 65/108 |
| 6,499,886 B1 | * | 12/2002 | Mizuno et al. | ............... 385/70 |
| 6,511,843 B2 | * | 1/2003 | Mizuno et al. | .......... 435/287.2 |

* cited by examiner

*Primary Examiner*—Peter Chin
*Assistant Examiner*—Eric Hug
(74) *Attorney, Agent, or Firm*—Frishauf, Holtz, Goodman & Chick, P.C.

(57) ABSTRACT

There are provided a method of manufacturing a glass part for connecting optical fibers, which allows insertion of optical fibers into the internal hole of the glass part smoothly, and glass parts for connecting optical fibers manufactured using the method. Predetermined parts of a glass tube having an internal hole are heated while pressure is applied into the internal hole, to expand the predetermined parts, thus forming tapered portions. As a result, a continuous curved surface can be achieved at the boundary between each tapered portion of each obtained glass part and the internal hole thereof, and the surface can be made smooth where the tapers are formed.

5 Claims, 9 Drawing Sheets

FIG.1

FIG.2A
BEFORE JOINING

FIG.2B
AFTER JOINING

FIG.2C
AFTER MACHININNG

FIG.3A
BEFORE JOINING

FIG.3B
AFTER JOINING

FIG.3C
AFTER MACHININNG

FIG.4A
BEFORE JOINING

FIG.4B
AFTER JOINING

FIG.4C
AFTER MACHININNG

FIG.5A
BEFORE JOINING

FIG.5B
AFTER JOINING

FIG.5C
AFTER MACHINING

FIG.6A
BEFORE JOINING

FIG.6B
AFTER JOINING

FIG.6C
AFTER MACHINING

METHOD OF MANUFACTURING GLASS PARTS FOR CONNECTING OPTICAL FIBERS, AND GLASS PARTS FOR CONNECTING OPTICAL FIBERS MANUFACTURED USING THE METHODS

BACKGROUND OF THE INVENTION

1. Field of the Invention

The present invention relates to a method of manufacturing glass parts for connecting optical fibers, and to glass parts for connecting optical fibers manufactured using the method.

2. Prior Art

Glass parts for connecting optical fibers are used as optical connectors, as optical fiber splices and as optical fiber connection supports of optical devices.

Figure 1:
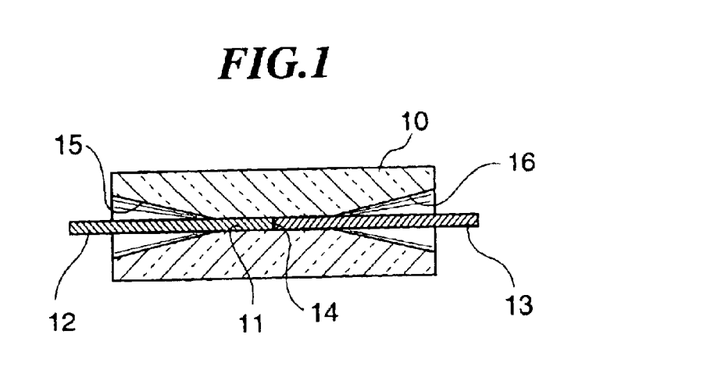
FIG. 1 is a cross-sectional view of a conventional optical connector.
Figure 2A:
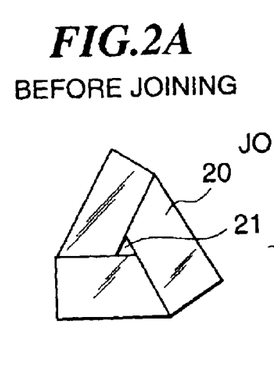
FIG. 2A shows the situation before joining.
Figure 2B:
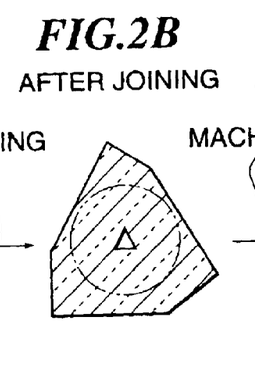
FIG. 2B shows the situation after joining.
Figure 2C:
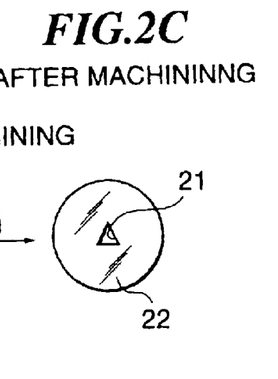
FIG. 2C shows the situation after machining.
Figure 3A:
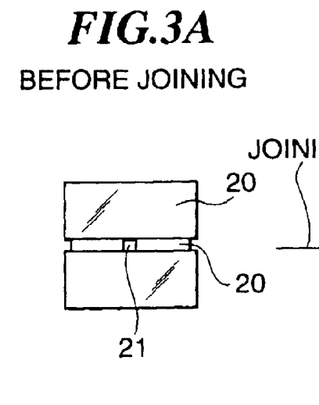
FIG. 3A shows the situation before joining.
Figure 3B:
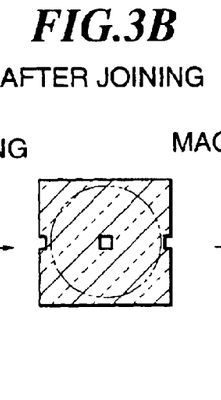
FIG. 3B shows the situation after joining.
Figure 3C:
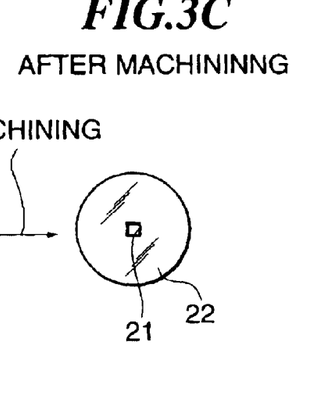
FIG. 3C shows the situation after machining.
Figure 4A:
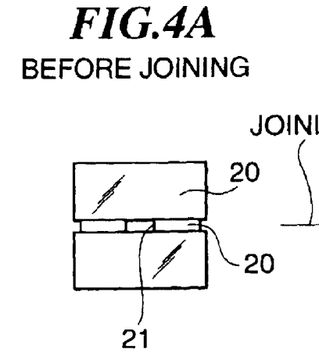
FIG. 4A shows the situation before joining.
Figure 4B:
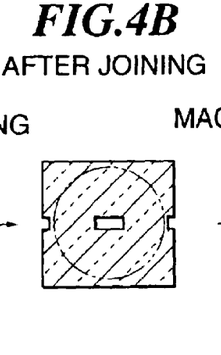
FIG. 4B shows the situation after joining.
Figure 4C:
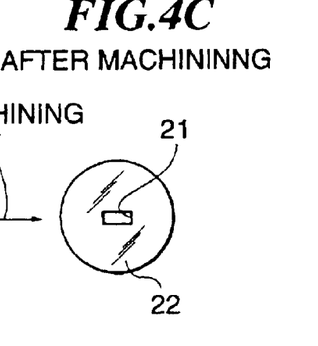
FIG. 4C shows the situation after machining.
Figure 5A:
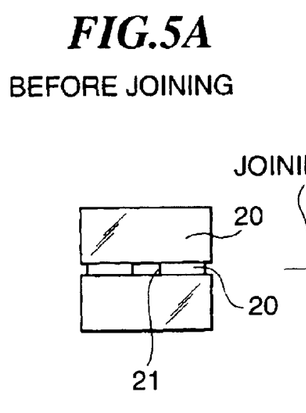
FIG. 5A shows the situation before joining.
Figure 5B:
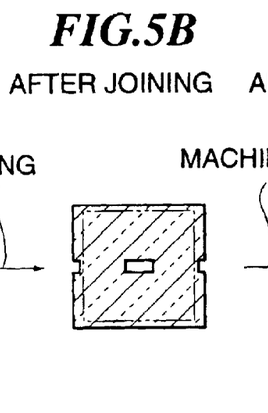
FIG. 5B shows the situation after joining.
Figure 5C:
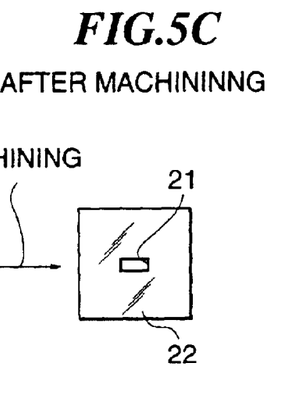
FIG. 5C shows the situation after machining.

An example of such a glass part for connecting optical fibers is an optical connector having a structure shown in FIG. 1. This optical connector is comprised of a cylindrical glass ferrule 10 having a narrow internal hole 11 along its longitudinal axis. Optical fibers 12 and 13 Are held in the internal hole 11, with their end faces 14 in contact with one another. A matching agent (such as an epoxy adhesive or an ultraviolet-cured resin), not shown, in the figure is filled between the end faces 14. The matching agent acts to match the refractive index between the optical fibers 12 and 13 as well as to bond the optical fibers 12 and 13 together.

The ferrule 10 is manufactured by heating and drawing a mother glass which has a cross-sectional shape approximately similar to that of the ferrule 10 and which possesses a through hole, and then cutting the drawn glass to the desired length.

Moreover, the internal hole 11 of the ferrule 10 is tapered at its open ends 15 and 16 so as to facilitate insertion of the optical fibers 12 and 13 into the internal hole 11. The above-mentioned matching agent or an adhesive is filled into the tapered open ends 15 and 16 and into the gaps between the optical fibers 12 and 13 and the wall of the internal hole 11, this being in order to fix the optical fibers 12 and 13 into the internal hole 11.

Methods for tapering the open ends 15 and 16 include an etching method in which unmasked portions are eroded away using a glass-eroding solution (for example, a hydrogen fluoride solution), a sandblasting method in which cutting is carried out using minute abrasive grains discharged from a fine nozzle at extremely high pressure, and a machining method involving drilling or the like.

However, with the etching method, erosion using the glass-eroding solution is slow, meaning that it is difficult to form a deep taper; moreover, an expensive mask is required, and it is difficult to control the amount of etching. It is thus difficult to make the boundary between the taper and the internal hole 11 into a continuous curved surface quickly and at low cost.

With the sandblasting method, the glass is worn down uniformly in all places, meaning that again it is difficult to make the boundary between the taper and the internal hole 11 into a continuous curved surface. Moreover, there is a tendency for the discharging of the minute abrasive grains to shift off-center, meaning that positioning must be carried out to high accuracy.

With the machining method, the machining takes a long time, there is a tendency for the glass parts to be weakened due to chipping or the formation of tiny cracks, and the boundary between the taper and the internal hole 11 ends up as a discontinuous surface. Moreover, there is a tendency for the machine tool (drill etc.) to shift off-center, meaning that it must be centered to high accuracy.

SUMMARY OF THE INVENTION

It is an object of the present invention to provide a method of manufacturing a glass part for connecting optical fibers, which allows insertion of optical fibers into the internal hole of the glass part smoothly, and glass parts for connecting optical fibers manufactured using the method.

To attain the above-mentioned object, the present invention provides a method of manufacturing glass parts for connecting optical fibers, comprising heating predetermined parts of a glass tube having an internal hole while applying pressure into the internal hole, to expand the predetermined parts, thus forming tapered portions.

With the manufacturing method according to the present invention, predetermined parts of a glass tube having an internal hole are heated while applying pressure into the internal hole, thus expanding the predetermined parts and forming tapered portions. As a result, a continuous curved surface can be achieved at the boundary between each tapered portion of each obtained glass part and the internal hole thereof, and the surface can be made smooth where the tapers are formed.

In a preferred embodiment of the present invention, the heating of the glass tube and the application of pressure into the internal hole are carried out while restricting an increase in the outside diameter of the glass tube. For example, the heating of the glass tube and the application of pressure into the internal hole are carried out while the glass tube is placed in a frame. In this way, tapers can be formed with no increase in the outside diameter of each obtained glass part at its tapered portion(s).

In another preferred embodiment of the present invention, the heating of the glass tube and the application of pressure into the internal hole are carried out while drawing the glass tube in a longitudinal axial direction thereof. In this way, the outside diameter of each obtained glass part can be reduced at its tapered portion(s).

The method of manufacuring glass parts for connecting optical fibers according to the present invention further comprises cutting each of the predetermined parts of the glass tube to obtain an open end in which one of the tapered portions is formed, after the heating of the glass tube and the application of pressure into the internal hole.

To attain the above object, the present invention further provides a glass part for connecting optical fibers manufactured as described above, wherein at least one of the open ends of the glass part is tapered in such a manner that a continuous curved surface is formed at the boundary between the at least one of the open ends and the internal hole of the glass part.

With the glass part according to the present invention, the boundary between each tapered portion and the internal hole is a continuous curved surface. As a result, optical fibers can be inserted into the internal hole smoothly.

The above and other objects, features and advantages of the invention will become more apparent from the following detailed description taken in conjunction with the accompanying drawings.

BRIEF DESCRIPTION OF THE DRAWINGS

FIGS. 2A to 2C are views useful in explaining a method of manufacturing a mother glass by bonding glass elements together, where the mother glass 22 has a circular cross section and the through hole 21 has an equilateral triangular cross section; specifically:

FIGS. 3A to 3C are views useful in explaining a method of manufacturing a mother glass by bonding glass elements together, where the mother glass 22 has a circular cross section and the through hole 21 has a square cross section; specifically:

FIGS. 4A to 4C are views useful in explaining of manufacturing a mother glass by bonding glass elements together, where the mother glass 22 has a circular cross section and the through hole 21 has a rectangular cross section; specifically:

FIGS. 5A to 5C are views useful in explaining of manufacturing a mother glass by bonding glass elements together, where the mother glass 22 has a square cross section and the through hole 21 has a rectangular cross section; specifically:

FIGS. 6A to 6C are views useful in explaining of manufacturing a mother glass by bonding glass elements together, where the mother glass 22 has a circular cross section and the through hole 21 has a circular cross section; specifically:

FIGS. 7A to 7C are views showing the shape of the internal hole 26 formed in a drawn glass tube 25, where the drawn glass tube 25 has a circular cross section and the internal hole 26 has a square cross section; specifically:

FIGS. 8A to 8C are views showing the shape of the internal hole 26 formed in a drawn glass tube 25, where the drawn glass tube 25 has a circular cross section and the internal hole 26 has an equilateral triangular cross section; specifically:

FIGS. 9A to 9C are views showing the shape of the internal hole 26 formed in a drawn glass tube 25, where the drawn glass tube 25 has a circular cross section and the internal hole 26 has a rectangular cross section; specifically:

FIGS. 10A to 10C are views showing the shape of the internal hole 26 formed in a drawn glass tube 25, where the drawn glass tube 25 has a square cross section and the internal hole 26 has a rectangular cross section; specifically:

FIGS. 11A to 11C are views showing the shape of the internal hole 26 formed in a drawn glass tube 25, where the drawn glass tube 25 has a circular cross section and the internal hole 26 has a circular cross section; specifically:

FIGS. 17A to 17F are sectional views of various examples of glass parts for connecting optical fibers manufactured using methods according to embodiments of the present invention; specifically:

FIGS. 18A to 18C are transverse sectional views of ferrules 30 for connecting a plurality of pairs of optical fibers; specifically:

DETAILED DESCRTPTION OF PREFERRED EMBODIMENTS

Embodiments of the present invention will now be described in detail with reference to the drawings.

First, a description will be given of a method of manufacturing glass parts for connecting optical fibers according to an embodiment of the present invention, with reference to the drawings.

A glass part for connecting optical fibers is comprised of a cylindrical glass ferrule having a narrow internal hole with a polygonal or circular cross section formed therein along the longitudinal axis thereof. Such ferrules are manufactured through the following steps. First step:

First, a mother glass is produced from a glass material through ordinary machining such as chopping, cutting and grinding, or through hot pressing or the like, or through post-machining processing that involves bonding glass elements together as described below. This mother glass has a cross-sectional shape approximately similar to that of the ferrules to be used as glass parts for connecting optical fibers. Throughout the present specification, "cross-sectional shape" refers to the shape of a section perpendicular to the direction in which the mother glass is drawn, hereinafter referred to.

FIGS. 2A to 6C are views useful in explaining of producing the mother glass by bonding glass elements together.

With this method of producing the mother glass, first, a plurality of glass elements 20 having a quadrangular cross section are prepared, with the number of glass elements 20 being the same as the number of sides possessed by the cross section of the internal hole of the ferrules to be obtained. The glass elements 20 are placed together in such a way that a through hole 21 having a polygonal cross section is formed between them, and are joined together using an adhesive or heat fusion. The periphery of the joined glass elements 20 is then made into a cylindrical or prismatic shape by machining or the like, thus producing the mother glass 22 from which ferrules will be manufactured. The completed mother glass 22 preferably has a cross-sectional area 100 to 5000 times that of the ferrules to be obtained.

There are no particular limitations on the material from which the mother glass 22 is made, but since optical fibers are made from quartz glass, it is preferably something like borosilicate glass having similar abrasive machining characteristics to quartz glass or else quartz glass itself. As an adhesive, any of various types can be used, for example an organic type, an acrylic type, an ultraviolet-cured type, a thermosetting type, or a two-part type (i.e. an adhesive that sets upon two liquid parts being mixed together).

There are no particular limitations on the size of the glass elements 20, but they preferably have a thickness of 1 to 50 mm, a width of 10 to 100 mm and a length of 300 to 1000 mm.

Figure 6A:
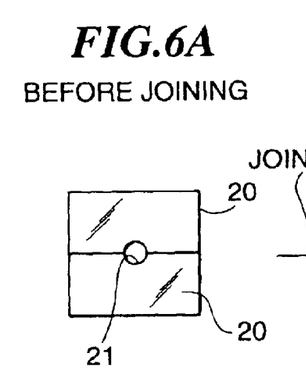
FIG. 6A shows the situation before joining.
Figure 6B:
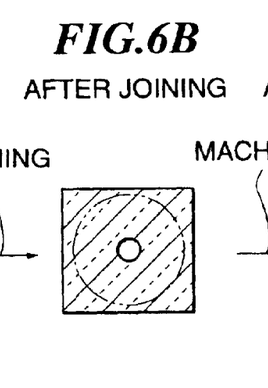
FIG. 6B shows the situation after joining.
Figure 6C:
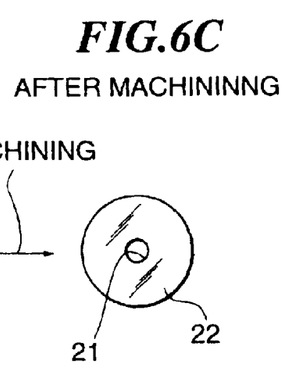
FIG. 6C shows the situation after machining.

Regarding FIGS. 2A to 6C, FIGS. 2A to 2C show a case where the mother glass 22 has a circular cross section and the through hole 21 has an equilateral triangular cross section. FIGS. 3A to 3C show a case where the mother glass 22 has a circular cross section and the through hole 21 has a square cross section. FIGS. 4A to 4C show a case where the mother glass 22 has a circular cross section and the through hole 21 has a rectangular cross section. FIGS. 5A to 5C show a case where the mother glass 22 has a square cross section and the through hole 21 has a rectangular cross section. FIGS. 6A to 6C show a case where the mother glass 22 has a circular cross section and the through hole 21 has a circular cross section.

With the present embodiment, the glass elements 20 have a quadrangular cross section, and the number of glass elements 20 used is the same as the number of sides possessed by the cross-sectional shape of the internal hole of the ferrules to be obtained. However, two glass element halves, a first half having a groove for the through hole 21 of the mother glass 22, and a second half that is joined to the first half so as to close off the open part of this groove may also be used. For example, as shown in FIG. 6A, the mother galss 22 may be formed by using a first half 20 having a groove for the through hole 21 of the mother glass and a second half 20 having a groove for the through hole 21, which is identical in shape with the groove of the first half, such that the first and second halves are joined together with openings of the grooves in alignment with each other. Second step:

The mother glass 22 produced through the first step is vertically suspended, and is drawn by being pulled downwards at a predetermined drawing speed, hereinafter referred to, while being fed into an electric furnace at a predetermined feed speed, hereinafter referred to, and heated; the electric furnace is controlled to keep the heating temperature of the mother glass 22 within a predetermined range, for example 600 to 930 C, or more preferably 730 to 930 C. The resulting hot drawn glass tube still has a cross-sectional shape similar to that of the mother glass 22. Typical dimensions for the drawn glass tube in the case that it has a circular cross section are an outside diameter of 0.2 to 2.5 mm, for example 2.0 mm, and an inside diameter of 0.1 to 0.3 mm, for example 0.126 mm.

In the present step, the drawn glass tube is also cut to a length of, say, 500 mm.

The ratio of the drawing speed to the feed speed for the mother glass 22 is preferably 20 to 4000. If this ratio is less than 20, then the drawing rate at which the mother glass 22 is drawn is low, resulting in poor productivity; if the ratio is greater than 4000, then the drawing rate is too large, resulting in instability in the shape of the cross section of the drawn glass tube perpendicular to the drawing direction. More preferably, the ratio is in the range 100 to 1000.

FIGS. 7A to 11C show possible cross-sectional shapes for the drawn glass tube.

Figures 7A, 7B:
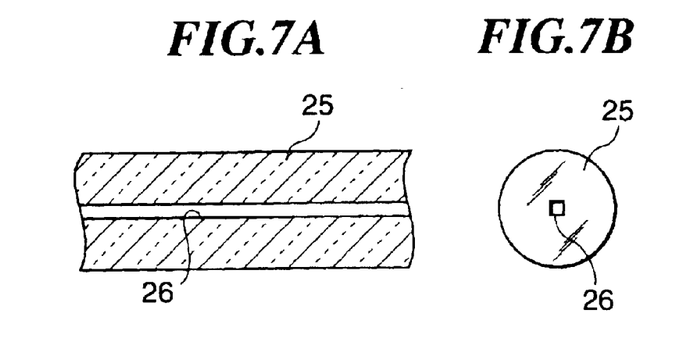
FIG. 7A shows a longitudinal section through the drawn glass tube.
FIG. 7B is a view from one end of the drawn glass tube.
Figure 7C:
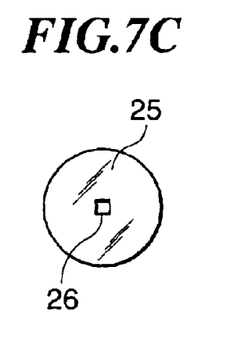
FIG. 7C is a view from the other end of the drawn glass tube.
Figures 8A, 8B:
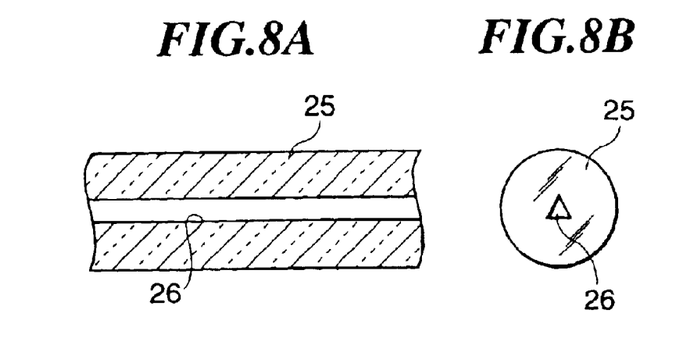
FIG. 8A shows a longitudinal section through the drawn glass tube.
FIG. 8B is a view from one end of the drawn glass tube.
Figure 8C:
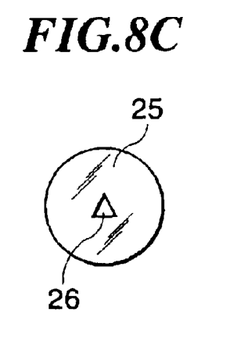
FIG. 8C is a view from the other end of the drawn glass tube.
Figures 9A, 9B:
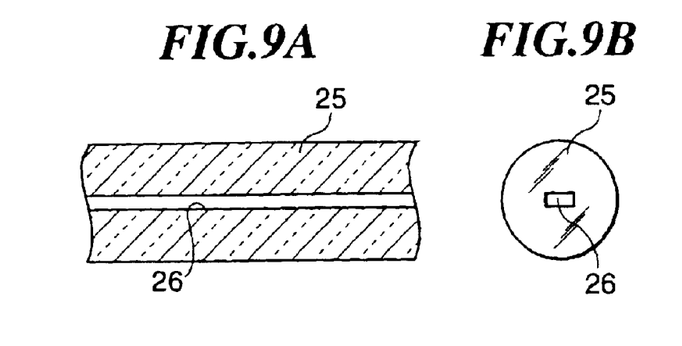
FIG. 9A shows a longitudinal section through the drawn glass tube.
FIG. 9B is a view from one end of the drawn glass tube.
Figure 9C:
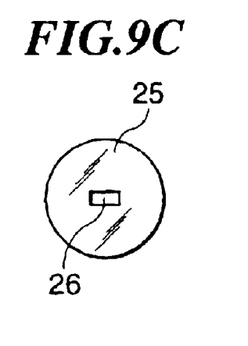
FIG. 9C is a view from the other end of the drawn glass tube.
Figures 10A, 10B:
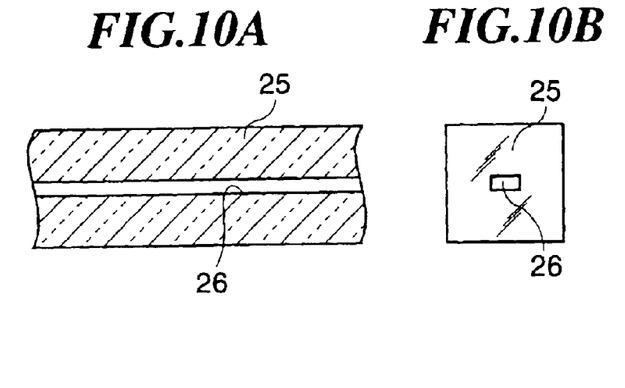
FIG. 10A shows a longitudinal section through the drawn glass tube.
FIG. 10B is a view from one end of the drawn glass tube.
Figure 10C:
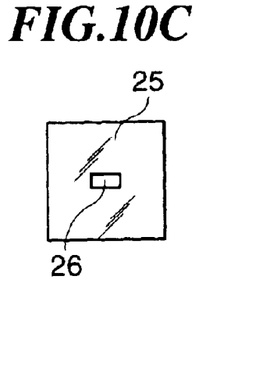
FIG. 10C is a view from the other end of the drawn glass tube.

In FIGS. 7A to 11C, the drawn glass tube produced through the second step is indicated by reference numeral 25, with this drawn glass tube 25 having an internal hole 26. FIGS. 7A to 7C show a case where the drawn glass tube 25 has a circular cross section and the internal hole 26 has a square cross section. FIGS. 8A to 8C show a case where the drawn glass tube 25 has a circular cross section and the internal hole 26 has an equilateral triangular cross section. FIGS. 9A to 9C show a case where the drawn glass tube 25 has a circular cross section and the internal hole 26 has a rectangular cross section. FIGS. 10A to 10C show a case where the drawn glass tube 25 has a square cross section and the internal hole 26 has a rectangular cross section. FIGS.

Figures 11A, 11B:
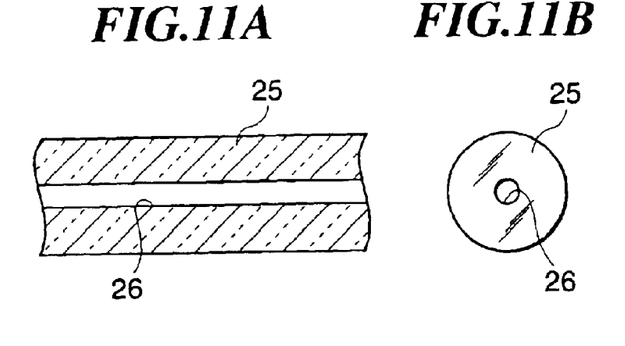
FIG. 11A shows a longitudinal section through the drawn glass tube.
FIG. 11B is a view from one end of the drawn glass tube.
Figure 11C:
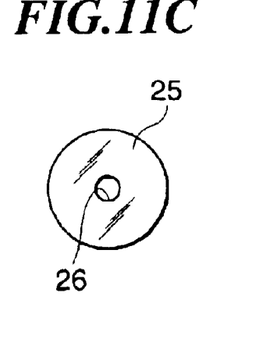
FIG. 11C is a view from the other end of the drawn glass tube.

11A to 11C show a case where the drawn glass tube 25 has a circular cross section and the internal hole 26 has a circular cross section. Various other combinations of the cross-sectional shape of the drawn glass tube 25 and the cross-sectional shape of the internal hole 26 are also possible. Third step:

In the glass parts for connecting optical fibers, at least one of the open ends of the internal hole 26 is tapered in order to facilitate the insertion of optical fibers into the internal hole 26. These taper(s) are formed in the present step.

Figure 12:
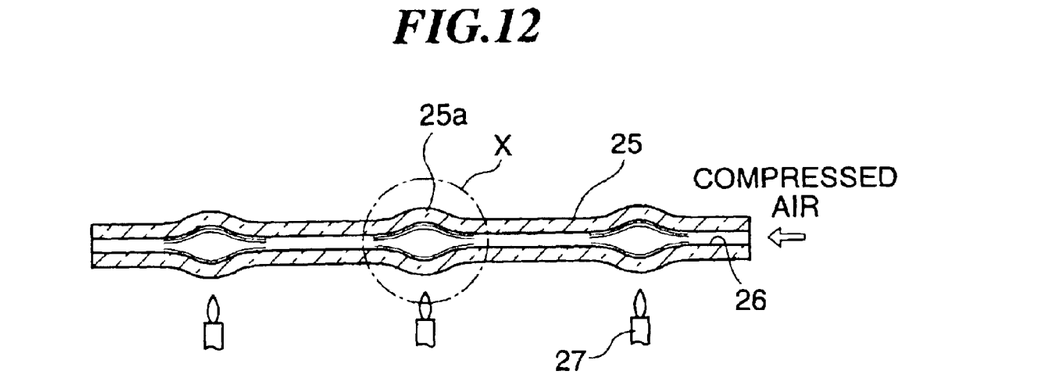
FIG. 12 is a view useful in explaining a method of manufacturing glass parts for connecting optical fibers according to a first embodiment of the present invention.

FIG. 12 illustrates a method of manufacturing glass parts for connecting optical fibers according to a first embodiment of the present invention.

Figure 13:
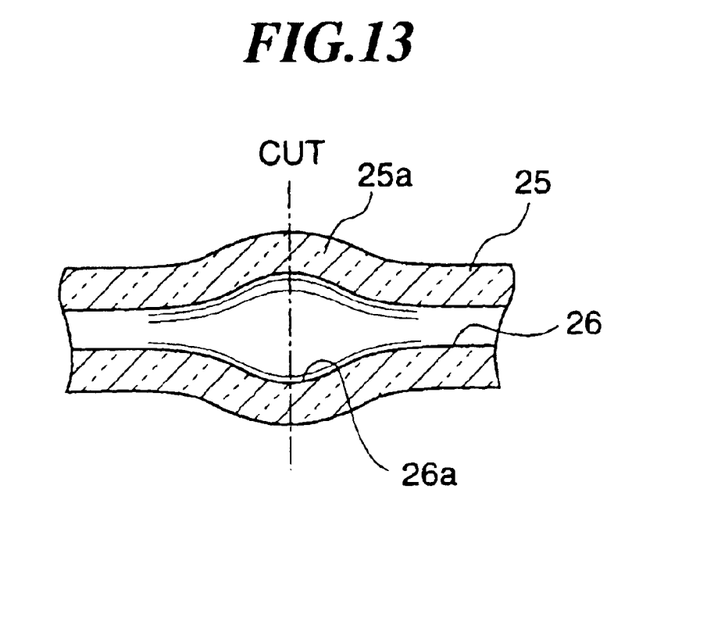
FIG. 13 is an enlarged view of part X shown in FIG. 12.

In FIG. 12, a drawn glass tube 25 produced through the second step is heated at a plurality of positions at predetermined intervals along the longitudinal axial direction of the drawn glass tube 25 using gas burners 27. The heating temperature is such that the viscosity of the glass used becomes $10^5$ to $10^{12}$ poise which in the case of soda lime glass is 600 to 930 C. During the heating, pressure is applied into the internal hole 26 of the drawn glass tube, for example, by means of compressed air from a compressor, not shown, so that the heated portions of the drawn glass tube 25 expand to form expanded portions 25a. An expanded portion 25a is shown in FIG. 13, which shows an enlarged view of part X from FIG. 12. A taper 26a is formed at the part of the internal hole 26 corresponding to each expanded portion 25a.

Heaters such as nichrome wire heaters can be used instead of the gas burners 27 for heating the drawn glass tube 25. Furthermore, an alternative method not involving compressed air may be used for applying pressure into the internal hole 26 of the drawn glass tube 25.

Moreover, during the present step, the drawn glass tube 25 may be rotated about its longitudinal axis so that the drawn glass tube 25 can be heated uniformly around its circumference. If the drawn glass tube 25 is not rotated, then it is desirable to arrange a number of gas burners 27 or nichrome wire(s) around the drawn glass tube 25.

The expanded portions of the drawn glass tube 25 can be made into various shapes by adjusting the heating temperature, heating time or heating region for the drawn glass tube 25, and/or by adjusting the pressure applied into the internal hole 26.

In the above-mentioned step, in the expanded portions 25a of the drawn glass tube 25 obtained, a continuous curved surface is achieved quickly and at low cost at the boundary between the taper 26a and the internal hole 26 in each expanded portion 25a, and the surface is smooth where the tapers 26a are formed since a fused surface is formed through the hot drawing step. Furthermore, since the tapers 26a are formed in the expanded portions 25a without grinding, the chipping and cracking that can occur with grinding do not occur, and moreover the cross-sectional area of the glass in the center of each expanded portion 25a in the longitudinal axial direction is the same as elsewhere in the drawn glass tube 25, resulting in that the glass is not weakened in the expanded portions 25A.

Figure 14:
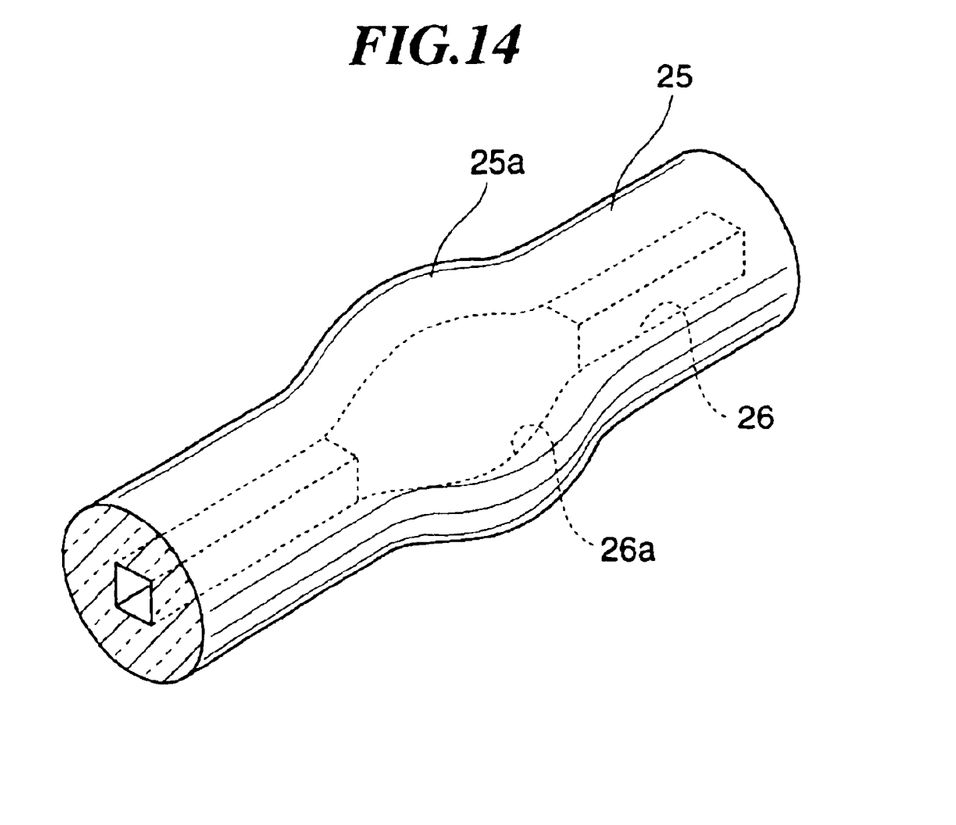
FIG. 14 shows the shape of an expanded portion 25A for the case that the internal hole 26 has a square cross section.

Moreover, in the above-mentioned step, the tapers 26a at the open ends end up with an approximately circular cross section even when the internal hole 26 has, for example, a triangular or quadrangular cross section, and even though no special steps are performed. As an example, FIG. 14 shows the shape of an expanded portion 25a for the case that the internal hole 26 has a square cross section. In the same way, the expanded portion 25a will also have an approximately circular cross section when the internal hole 26 has a triangular or any other polygonal cross section, even though no special steps are performed. Fourth step:

The drawn glass tube 25 is next cut at the center of each expanded portion 25a in the longitudinal axial direction (the dashed line in FIG. 13 shows the position of a cut), and if necessary at other desired positions in the longitudinal axial direction. In this way, glass parts for connecting optical fibers, namely ferrules in which taper(s) 26a are formed at the open end(s) of the internal hole 26 are obtained. Each ferrule has a length of no more than 50 mm, for example 10 mm. The cutting is performed by means of a diamond saw, a glasscutter, a water jet, or the like.

Half of each expanded portion 25a forms a tapered portion of one of the obtained ferrules. The boundary between this taper 26a and the internal hole 26 is a continuous curved surface, and moreover the surface is smooth where the taper 26a is formed since a fused surface is formed there through the hot drawing step. This facilitates insertion of optical fibers into the internal hole 26.

Figure 15A:
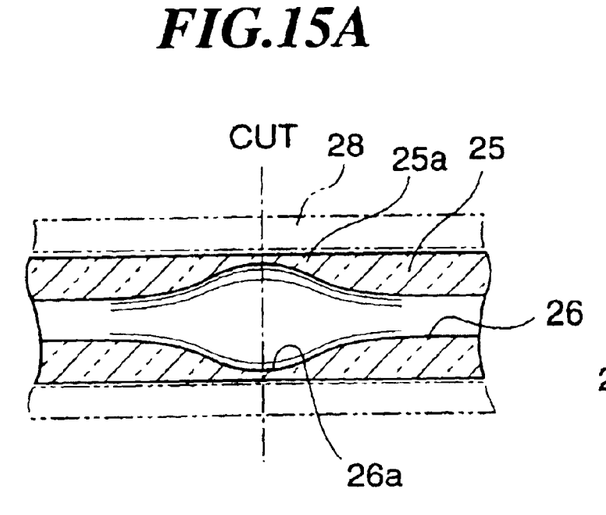
FIGS. 15A and 15B are views useful in explaining a method of manufacturing glass parts for connecting optical fibers according to a second embodiment of the present invention.
Figure 15B:
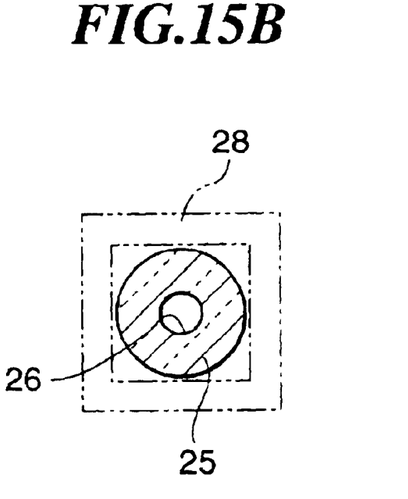

FIGS. 15A and 15B illustrate a method of manufacturing glass parts for connecting optical fibers according to a second embodiment of the present invention.

With this embodiment, the drawn glass tube 25 is put into a frame 28. The drawn glass tube 25 is then heated at predetermined positions as with the above-mentioned first embodiment, but this time from outside the frame 28 and is then cut at the desired positions (the dashed line in FIG. 15 is the position of a cut). In this way, tapers 26a can be formed without the outside diameter of the drawn glass tube 25 increasing at the expanded portions 25a.

Figure 16:
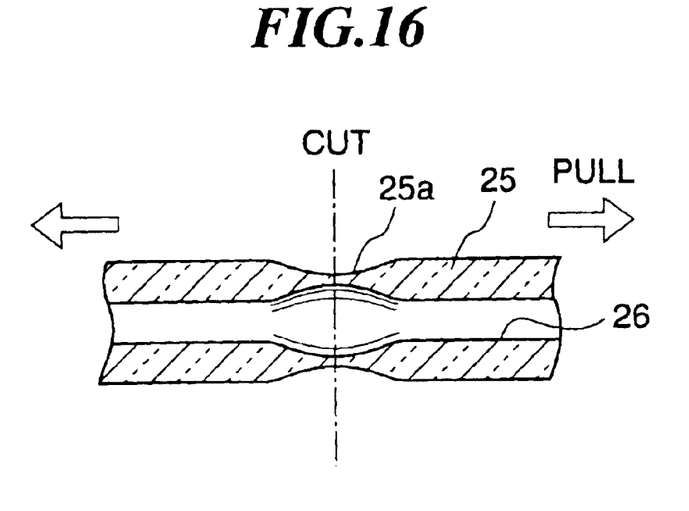
FIG. 16 is a view useful in explaining a method of manufacturing glass parts for connecting optical fibers according to a third embodiment of the present invention.

FIG. 16 illustrates a method of manufacturing glass parts for connecting optical fibers according to a third embodiment of the present invention.

With this embodiment, the drawn glass tube 25 is pulled in the longitudinal axial direction while being heated as for the above-mentioned first embodiment, and is then cut at the desired positions (the dashed line in FIG. 16 shows the position of a cut). In this way, the outside diameter of the drawn glass tube 25 can be reduced at the expanded portions 25a. The heating and pulling is preferably carried out with the drawn glass tube 25 placed inside a frame 28 like that used with the second embodiment.

FIGS. 17A to 17F are sectional views of various examples of glass parts for connecting optical fibers manufactured using methods according to embodiments of the present invention.

Figure 17A:
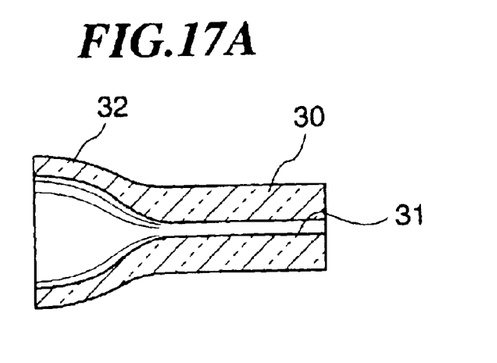
FIG. 17A shows a case where only one of the open ends of the internal hole 31 is tapered and the tapered portion 32 is flared.
Figure 17B:
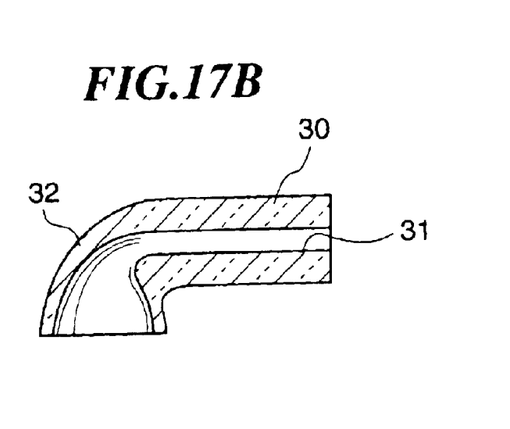
FIG. 17B shows a case where the tapered portion 32 of the ferrule 30 of FIG. 15A is bent through 90 degrees.
Figure 17C:
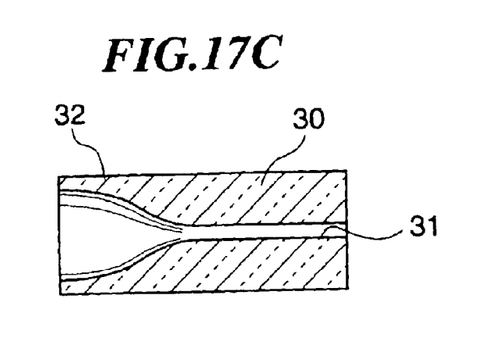
FIG. 17C shows a case where only one of the open ends of the internal hole 31 is tapered and the tapered portion 32 does not have an increased outside diameter.
Figure 17D:
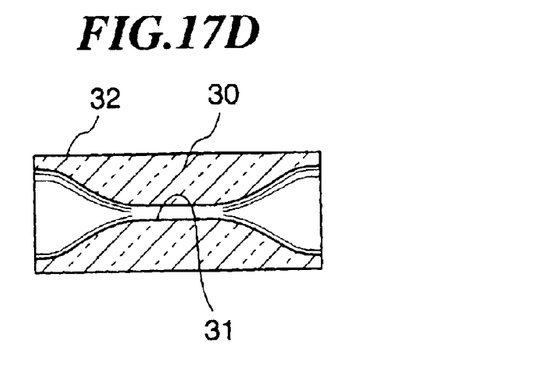
FIG. 17D shows a case where both of the open ends of the internal hole 31 are tapered and the tapered portions 32 do not have an increased outside diameter.
Figure 17E:
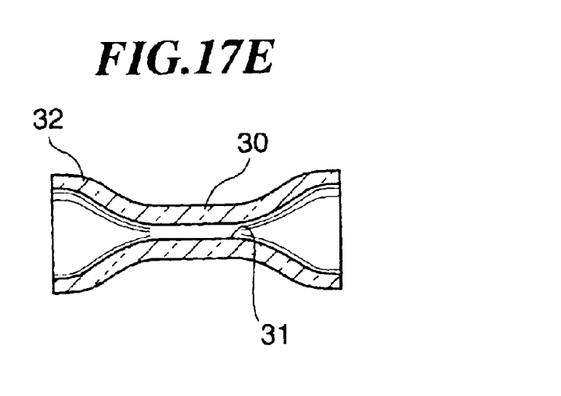
FIG. 17E shows a case where both of the open ends of the internal hole 31 are tapered and the tapered portions 32 are flared.
Figure 17F:
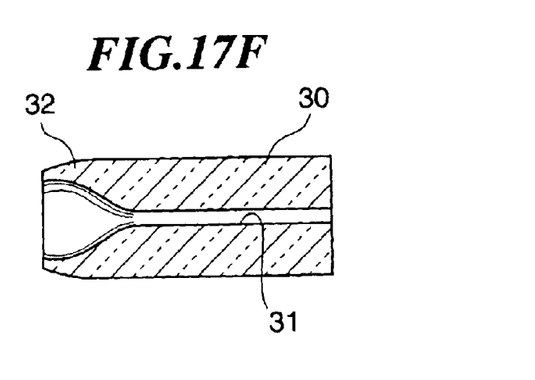
FIG. 17F shows a case where only one of the open ends of the internal hole 31 is tapered and the tapered portion 32 has a reduced outside diameter.

Each glass part for connecting optical fibers is comprised of a ferrule 30 having an internal hole 31 and tapered portion(s) 32. FIG. 17A shows a case where only one of the open ends of the internal hole 31 is tapered and the tapered portion 32 is flared. FIG. 17B shows a case where the tapered portion 32 of the ferrule 30 of FIG. 15A is bent through 90 degrees. FIG. 17C shows a case where only one of the open ends of the internal hole 31 is tapered and the tapered portion 32 does not have an increased outside diameter. FIG. 17D shows a case where both of the open ends of the internal hole 31 are tapered and the tapered portions 32 do not have an increased outside diameter. FIG. 17E shows a case where both of the open ends of the internal hole 31 are tapered and the tapered portions 32 are flared. FIG. 17F shows a case where only one of the open ends of the internal hole 31 is tapered and the tapered portion 32 has a reduced outside diameter.

With the ferrules 30 described above, one optical fiber is inserted into each end of the internal hole 31. However, such ferrules may be used as the type for which a plurality of optical fibers are inserted into each end of the internal hole 31, this being for the case that optical signals are transmitted and received, i.e. sent in both directions.

Figure 18A:
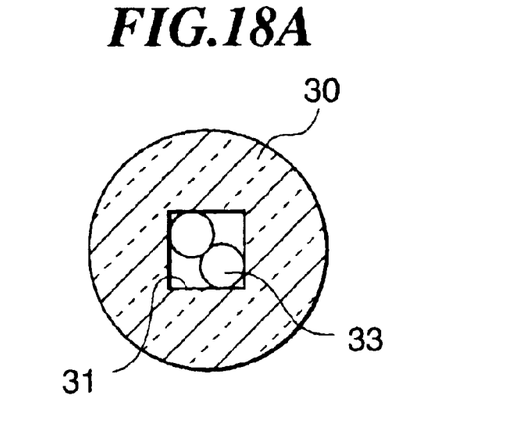
FIG. 18A shows a situation in which two pairs of optical fibers 33 are held in an internal hole 31 having a square cross section.
Figure 18B:
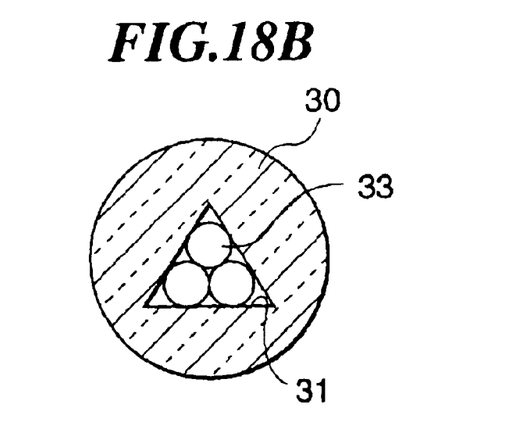
FIG. 18B shows a situation in which three pairs of optical fibers 33 are held in an internal hole 31 having an equilateral triangular cross section.
Figure 18C:
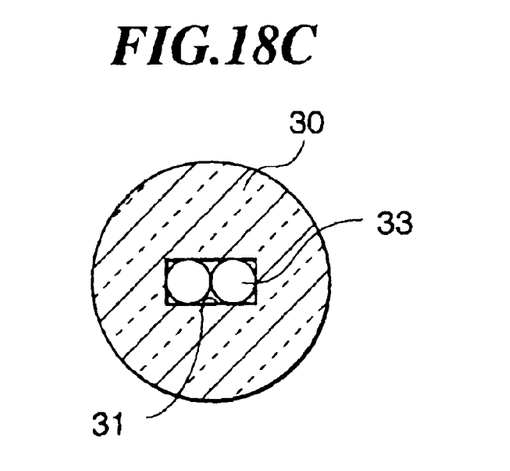
FIG. 18C shows a situation in which two pairs of optical fibers 33 are held in an internal hole 31 having a rectangular cross section.

FIGS. 18A to 18C are transverse sectional views of ferrules 30 for connecting a plurality of pairs of optical fibers. FIG. 18A shows a situation in which two pairs of optical fibers 33 are inserted into each end of an internal hole 31 having a square cross section. FIG. 18B shows a situation in which three pairs of optical fibers 33 are inserted into each end of an internal hole 31 having an equilateral triangular cross section. FIG. 18C shows a situation in which two pairs of optical fibers 33 are inserted into each end of an internal hole 31 having a rectangular cross section.

As shown in FIGS. 18A to 18C, when the internal hole 31 has a square, triangular or rectangular cross section, a plurality of pairs of optical fibers 33 can be held in the single internal hole 31 in such a way that the axes of optical fibers of each pair are accurately aligned, and moreover removal of both air and matching agent or adhesive can be carried out via the gaps between the optical fibers 33 and the wall of the internal hole 31 when abutting the optical fibers 33 in the internal hole 31.

The glass parts for connecting optical fibers described in the above embodiments can be used as optical connectors, as optical fiber splices, and as optical fiber connection supports of optical devices.

What is claimed is:

1. A method of manufacturing glass parts for connecting optical fibers, the method comprising:

placing and joining a plurality of glass elements together in such a manner that a through hole is formed between the glass elements;

forming a periphery of the joined glass elements into a predetermined shape;

drawing the formed glass elements so as to obtain a glass tube;

placing said glass tube into a frame;

heating predetermined parts of the glass tube from outside the frame while applying pressure into said through hole so as to expand said predetermined parts, thus forming tapered portions;

wherein the frame restricts an increase in an outside diameter of the glass tube.

2. A method of manufacturing glass parts for connecting optical fibers as claimed in claim 1, wherein the heating of said glass tube and the application of pressure into said through hole are carried out while drawing said glass tube in a longitudinal axial direction thereof.

3. A method of manufacturing glass parts for connecting optical fibers as claimed in claim 1, further comprising cutting each of the predetermined parts of said glass tube to obtain an open end in which one of said tapered portions is formed, after the heating of said glass tube and the application of pressure into said through hole.

4. A method of manufacturing glass parts for connecting optical fibers as claimed in claim 1, wherein the glass tube has open ends, and at least one of the open ends of the glass tube is tapered in such a manner that a continuous curved surface is formed at a boundary between the at least one of the open ends and said through hole.

5. A method of manufacturing glass parts for connecting optical fibers, the method comprising:

placing and joining a plurality of glass elements together in such a manner that a through hole is formed between the glass elements;

forming a periphery of the joined glass elements into a predetermined shape;

drawing the formed glass elements so as to obtain a glass placing the glass tube into a frame; and applying heat through the frame to predetermined parts of the glass tube from outside the frame while applying pressure into said through hole of the glass tube so as to expand said predetermined parts, thus forming tapered portions;

wherein the frame restricts an increase in an outside diameter of the class tube.

* * * * *